Aug. 5, 1924.
V. E. HEYWOOD
AEROPLANE
Filed June 1, 1920
1,503,950
3 Sheets-Sheet 1
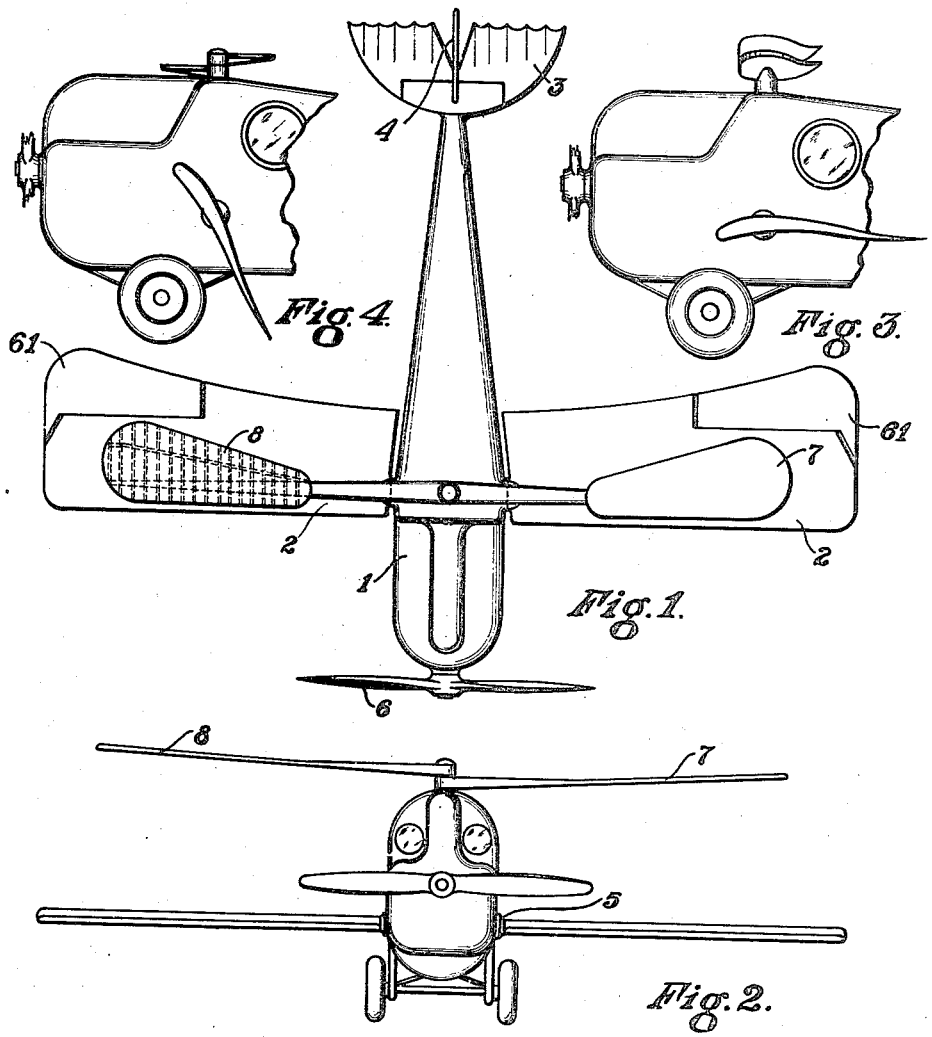
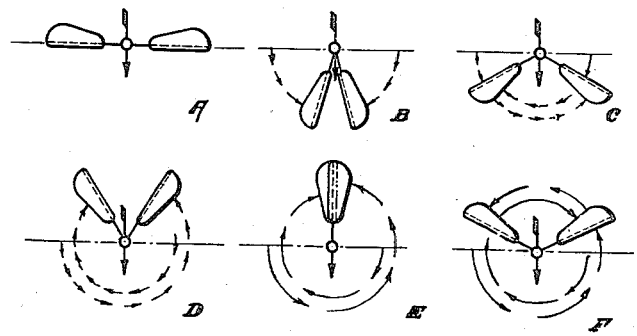
Inventor
VINCENT E. HEYWOOD
Geo. W. Kennedy Jr.
Attorney

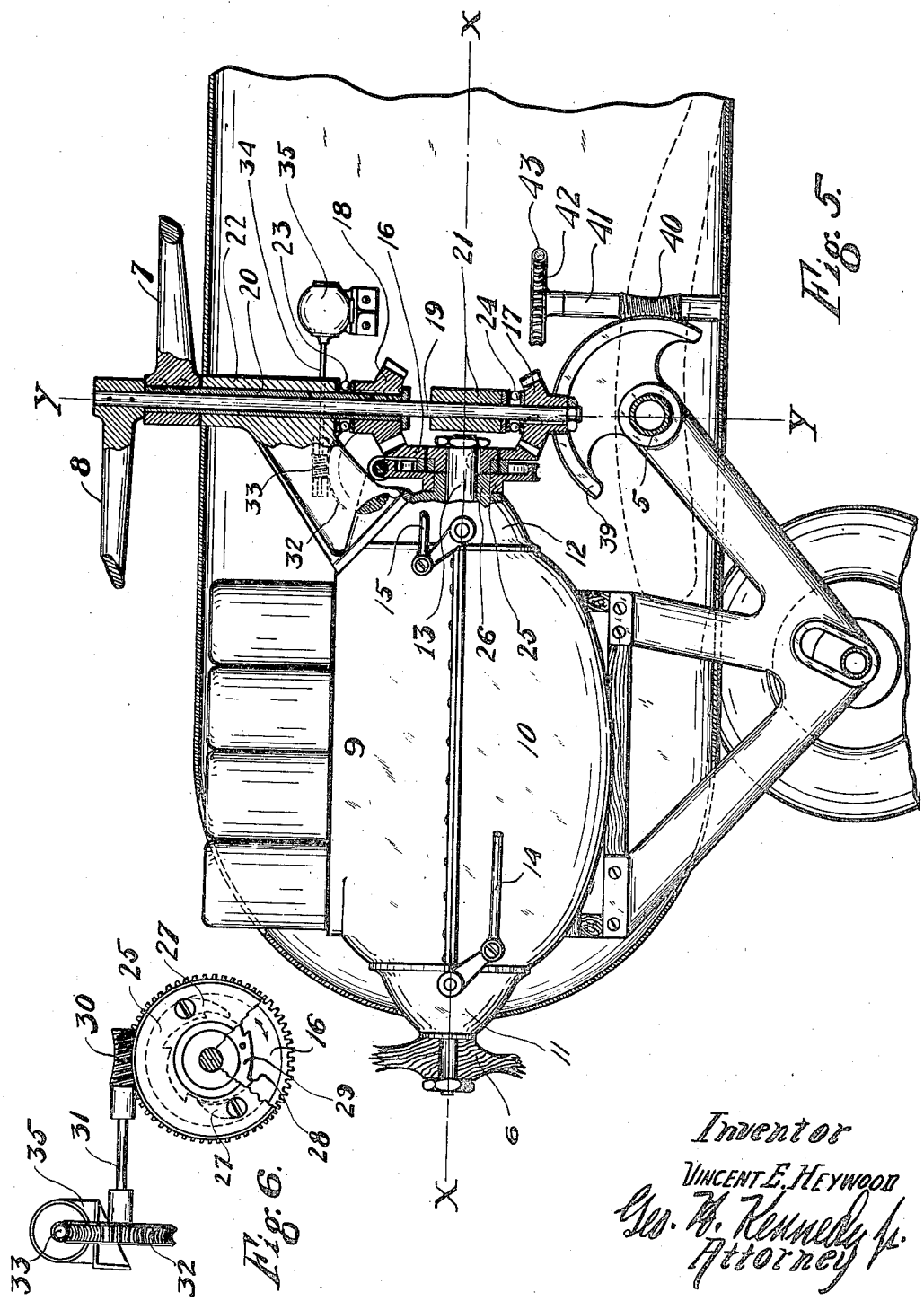

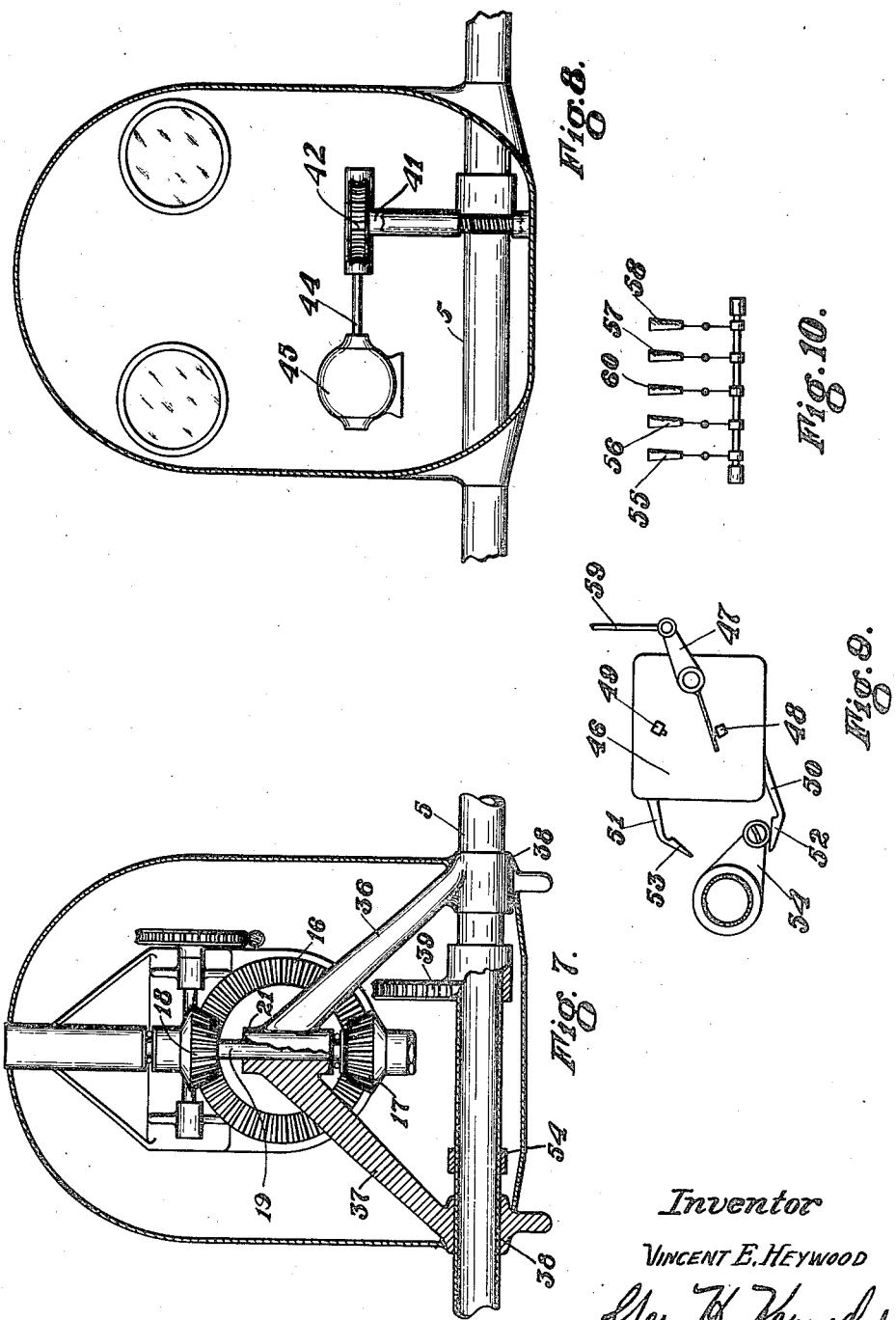

Patented Aug. 5, 1924.

1,503,950

UNITED STATES PATENT OFFICE.

VINCENT E. HEYWOOD, OF WORCESTER, MASSACHUSETTS.

AEROPLANE.

Application filed June 1, 1920. Serial No. 385,814.

*To all whom it may concern:*

Be it known that I, VINCENT E. HEYWOOD, a citizen of the United States, residing at Worcester, in the county of Worcester and Commonwealth of Massachusetts, have invented a new and useful Improvement in an Aeroplane, of which the following, together with the accompanying drawings, is a specification.

My invention relates to aeroplanes, and has for its object to provide an improved type of plane that is particularly well adapted for ascending or descending rapidly at steep angles.

It has heretofore been proposed to employ helicopters for ascending rapidly, a helicopter being a device comprising propeller blades revolving in a horizontal plane, so as to obtain a maximum lifting effect of the blades. While helicopter devices ascend almost vertically, the fact that the propeller blades have little or no sustaining effect when not revolving renders such devices unsuitable for general flying purposes, for obviously there is nothing to prevent the helicopter from falling should the power plant cease to function while in mid air.

By my invention I propose to employ the principle of the helicopter in a plane adapted for general flying purposes, whereby the plane is adapted to ascend and descend almost vertically, and at the same time is adapted to travel forward in the same manner as other planes, all of these advantageous results being obtained without sacrificing the stability of the plane.

In carrying out my invention, I employ a plane equipped with an ordinary propeller of either the tractor or pusher type, and a pair of wings or aerofoils of ordinary construction. The plane is further equipped with a pair of wings or aerofoils revolvable in opposite directions about a vertical axis to exert a maximum lifting effect when rising and arranged to be locked in position to exert a maximum sustaining effect when the plane is travelling forward under the influence of the propeller. In addition, the stationary wings are adapted to be moved into such a position that they will present a minimum amount of resistance to ascending when the other wings are revolving. These and other advantageous features of my invention will hereinafter more fully appear, reference being had to the accompanying drawings, in which—

Figure 1 is a plan view of an aeroplane embodying my invention.

Figure 2 is a view in front elevation of the plane shown in Fig. 1.

Figure 3 is a view in side elevation of a portion of the aeroplane, with the stationary wings in position for flying forward.

Figure 4 is a view similar to Fig. 3, showing the stationary planes in position for ascending or descending.

Figure 5 is a view partly in section and partly in side elevation showing the mechanism located in the fuselage of the machine.

Figure 6 is a fragmentary view showing the mechanism for controlling the revolvable wings.

Figures 7 and 8 are detailed views showing the mechanism for controlling the position of the stationary wings.

Figure 9 is a detailed view showing the control for the motor for shifting the stationary wings.

Figure 10 is a diagrammatic view showing the arrangement of the control for the aeroplane.

Figure 11 is a diagrammatic view showing the relative positions occupied by the revolvable wings.

Similar reference characters refer to similar parts in the different figures.

Referring to Figs. 1 and 2, the aeroplane generally comprises a fuselage 1 provided with stationary cambered wings or aerofoils 2, 2, an elevator 3, and a rudder 4, all of these parts being of any well known type or form. The wings 2, 2, are mounted at the respective ends of a shaft 5 extending horizontally through the fuselage 1, for a purpose to be hereinafter described. The aeroplane is here shown as being of the tractor type, with a propeller 6 carried at the front end of the fuselage 1 and rotatable about a horizontal axis X, X. A second pair of cambered wings or aerofoils 7 and 8 are mounted at the top of the fuselage 1 and are adapted to revolve about a vertical axis Y, Y. The wings 7 and 8 are tilted upward slightly for a purpose to be hereinafter described.

The terms "cambered wing" and "aerofoil" as employed hereafter in this application are meant to convey the idea of a wing, the upper and lower surfaces of which are of different curvature, as clearly shown in Fig. 3, so that a lifting force is exerted upon the wing when it is moved through the air. Such wings have heretofore been employed in connection with aeroplanes and are well known to those skilled in the art. It has been found that the lifting force developed by a cambered wing or aerofoil is due to the partial neutralization of different pressures on opposed surfaces of the wing when the latter is moved through the air. This property of a cambered wing or aerofoil will be hereinafter referred to.

Referring now to Fig. 5, a motor 9 is mounted at the forward end of the fuselage 1 and its crank case 10 is provided with end housings 11 and 12, within which are located suitable clutches connecting the crank shaft of the motor to the propeller 6 and to an auxiliary driving shaft 13. Operating levers 14 and 15 extend from the end housings 11 and 12 respectively to the operator's seat, by means of which the clutches may be operated, so as to drive the propeller 6 and the shaft 13 as may be desired.

A bevel gear 16 is mounted on the end of the shaft 13 and is in mesh with bevel pinions 17 and 18 carried on a shaft 19 and a sleeve 20, respectively. The wing 8 is mounted at the upper end of the shaft 19 which is rotatably supported by a bracket 21 about the axis Y, Y. The wing 7 is carried on the sleeve 20 which surrounds the shaft 19 and is rotatably supported in a bracket 22 carried by the fuselage 1. Suitable thrust bearings 23 and 24 are provided between the pinions 17 and 18 and the brackets 21 and 22, respectively.

A worm wheel 25 is loosely mounted on a bearing 26 supporting the shaft 13 and is provided with a plurality of pawl members 27. As best shown in Fig. 6, the pawl members 27 are adapted to engage a plurality of ratchet teeth 28 that are formed on a ring 29 secured to the gear 16. The pawl members 27 are arranged to permit rotation of the gear 16 with the shaft 13. The worm wheel 25 is adapted to be driven by a worm 30 mounted on a shaft 31 that is provided at the end with a second worm wheel 32. The worm wheel 32 is in turn driven through a worm 33 carried on one end of a shaft 34 that is driven by an electric motor 35. The operation of the motor 35 is adapted to be controlled through a suitable switch, not shown, whereby the worm wheel 25 may be caused to rotate and drive the gear 16 by engagement of the pawls 27 in the same direction of rotation as it is driven by the shaft 13.

Referring now to Figs. 7 and 8, the bracket 21 which supports the shaft 19 is provided with a pair of downwardly diverging arms 36 and 37, which are provided at their extremities with bearings 38 for the shaft 5 which supports the stationary wings 2, 2. A worm sector 39 is mounted on the shaft 5 between the bearings 38 and is in engagement with a worm 40 mounted on a shaft 41, as best shown in Fig. 5. A worm wheel 42 is mounted at the upper extremity of the shaft 41 in engagement with a worm 43 carried on the shaft 44 of an electric motor 45. The operation of the motor 45 is adapted to be regulated through a control box 46, whereby the sector 39 may be caused to turn the wing shaft 5 in either direction of rotation. When the sector 39 is in the position shown in Fig. 5, the wings 2 are in substantially horizontal position, as shown in Fig. 3. When the sector 39 is moved to its other extreme position by the rotation of the worm 40, the wings 2 occupy the position shown in Fig. 4, in which position the angle of incidence of the wings is substantially a maximum.

The control box 46 is provided with a movable contact arm 47 that is adapted to engage separate pairs of stationary contact members 48 and 49, respectively. When the contact arm 47 is in engagement with the contact members 48, the motor 45 is operated in one direction of rotation, and when the contact arm 47 is in engagement with the contact members 49, the motor 45 is operated in the opposite direction of rotation. Tripping levers 50 and 51 are pivotally mounted in the control box and are provided with fingers 52 and 53 which are in the line of movement of a cam 54 provided on the shaft 5. The cam 54 is adapted to engage either of the fingers 52 or 53 when the worm sector 39 has been moved nearly to the end of its travel. The movement of the tripping levers 50 and 51 by the cam is adapted to throw the contact arm 47 out of engagement with either pair of contact members 48 or 49. In this way the electric motor 45 is adapted to be cut off from its source of power before the worm 40 can over-run the worm sector 39, in either direction of rotation.

Referring now to Fig. 10, there is shown a diagrammatic arrangement of the control for an aeroplane embodying my invention. The levers 55 and 56 are connected to the clutch operating levers 14 and 15, respectively, for controlling the connection of the crank shaft of the motor to either the propeller 6 or the driving shaft 13. The lever 57 is connected to the switch which controls the operation of the electric motor 35 and the lever 58 is connected to the contact arm 47 on the control box 46, by means of a rod 59, shown in Fig. 9. The lever 60 is connected to the throttle of the motor 9 in any suitable manner.

Having thus described the various parts entering into my invention, the operation thereof is as follows:—When it is desired to start the motor preparatory to a flight, the wings, 2, 2, 7 and 8 are set in "flying position" as shown in Fig. 1, and the clutch in housing 11, is thrown in, by means of lever 55, thereby connecting the propeller 6 directly to the motor 9. The clutch in housing 12 is then out of engagement, as no lifting force is desirable when testing the motor 9. The motor 9 is then started in the usual manner, by turning over the propeller 6. When the motor has warmed up and is operating properly, the pilot moves the lever 58 which starts motor 45, and thereby turns the lower wings 2, 2, until they have the maximum angle of incidence, as shown in Fig. 4. This position of the wings 2 lessens the "drag" or head resistance in climbing, although it is not absolutely necessary for successful ascension. When wings 2, 2, have reached the limit of their movement, the cam 54 automatically stops the motor 45 and locks the wings in "climbing position."

The pilot, by means of clutch lever 55, then partially disengages propeller 6 from the motor 9 and reduces its speed to about 400 revolutions per minute. This speed is just sufficient to keep the necessary amount of air blowing past the ailerons 61 and the elevator 3, so that the craft can be controlled in the usual manner. In other words, propeller 6 must revolve just fast enough to give the pilot control over the craft.

With wings as shown in Fig. 4, and the propeller 6 revolving at about 400 revolutions per minute, the clutch lever 56 is gradually thrown in, simultaneously with the gradual opening of the throttle 60, to accelerate the motor 9 and take up the work of revolving the wings 7 and 8. When the clutch lever 56 is entirely in, the throttle 60 can be opened wide and the plane will start to rise or "take off" with a very steep angle of climb. When the wings 6 and 7 start to revolve, they will exert a very great lifting effect owing to the fact that these wings are moving through the air at a high rate of speed, while the plane itself has substantially no forward movement; consequently the lifting force developed by the neutralization of pressures between opposed surfaces of these wings will be a maximum. As soon as the plane is clear of the field, the motor 45 can be reversed and clutch lever 55 thrown all the way in. These operations will cause the wings 2, 2, to return to their normal flying position, that is, substantially horizontal, and at the same time the propeller 6 will speed up to about 1000 revolutions per minute, the speed of the wings 7 and 8 falling off as the motor assumes the load of the propeller. This condition, that is, with both the propeller 6 and the wings 7 and 8 connected directly to the motor at full speed, is very suitable for rapid climbing, although at a somewhat less steep angle than when clearing the field.

With the wings 7 and 8 revolving while the plane is in forward flight, as described above, these wings will continue to exert a greater lifting effect than the wings 2, owing to the fact that the wings 7 and 8 are being moved through the air at a greater relative speed than the wings 2. When the wings 7 and 8 are revolving either in climbing or in forward flight, the fact that they are tilted upward slightly, as previously described, tends to minimize the disturbing or unbalancing effect of the centrifugal force developed by their rotation. This is due to the fact that the upward force developed by the movement of the wings 7 and 8 through the air acts generally toward the center of revolution of the wings, and therefore opposes the tendency for the wings to throw the plane out of balance.

When sufficient altitude has been attained, the pilot disconnects the wings 7 and 8 from the engine by means of lever 56, and moves the switch lever 57 to start the worm wheel 25 revolving in the same direction as the bevel gear 16, but at a slower speed. The motor 9, freed from the load of the wings, then drives the propeller 6 alone at about 1600 revolutions per minute, unless throttled down. The plane, at this period, will be in normal horizontal flight and the rush of air past the released wings 7 and 8 will slow them down until the bevel gear 16 is picked up by the pawls 27 on the worm wheel 25, and any further diminution of speed is thereby prevented. The pilot will be able to judge when the gear 16 is driven by the pawls and will shut off the electric motor 35 when the leading edges of the wings 7 and 8 are nearly in a straight line, as shown at F in Fig. 11. The stoppage of motor 35 locks the wings 7 and 8 in flying position, whereupon they function like the ordinary top wings of any biplane, and the plane may then be flown in the usual manner. It is obvious that the pilot may stop the motor 35 so that the wings 7 and 8 will be locked with any desired angular relation or "sweep-back" between them.

Landing may be accomplished in the usual manner when the field permits sufficient gliding space, but when a steep angle of descent is made necessary by the difficult nature of the field the revolution of the wings 7 and 8 may again be utilized to great advantage. The pilot partially lets in the clutch connecting the wings to the motor 9, thereby causing the wings 7 and 8 to revolve slowly and so prevent the plane from approaching the ground too rapidly. By properly manipulating the clutch and throttle levers, the speed of revolution of the wings can be so controlled that the plane can be made to almost settle to the ground. The motor can be allowed to run continuously at a relatively high speed while a landing is being made, so that the chances of stalling are reduced to a minimum. This greatly decreases the liability of landing accidents, for it is obvious that a plane embodying my invention will always be under perfect control at all times while a landing is being made, and will be ready to respond quickly to the controls should an emergency arise which requires a quick ascent.

From the foregoing it is apparent that I have provided an aeroplane that not only embodies all of the advantageous features of the standard planes heretofore constructed, but also possesses the great climbing ability of helicopter devices, without the loss of stability which has heretofore rendered the use of such devices impracticable. I accomplish these results by providing a plane having a portion the area of its wings or aerofoils area functionable either when revolving about a given axis to give a maximum lifting effect, or when fixed in position as a part of the permanent wing area, to give a maximum sustaining effect. In other words I have provided a plane or air craft which is dependent in normal flight upon the lifting effect developed by the neutralization of unequal pressures on opposed surfaces of its wing area by movement through the air with the plane, and which is also capable of rapid upward movement by moving a portion of its wing area at a speed relatively greater than that of the plane itself. In case of engine failure, the pilot has the same chances of gliding to safety as in a standard plane, for it is but the work of a moment to fix the revolvable wings in position for gliding.

While I have shown my invention as being applied to a particular type of plane and with a particular arrangement of the revolvable wing portions, it is not so limited, but is capable of various modifications without departing from the spirit and scope thereof. I desire therefore that only such limitations be imposed thereon as come within the scope of the appended claims.

I claim,

1. In an aeroplane, a pair of wings revolvable about a vertical axis, means for revolving said wings in opposite directions, means for disconnecting said wings from said revolving means and means for locking said wings in flying position.

2. In an aeroplane, superposed pairs of wings movable about axes at right angles to each other, means for revolving one pair of wings about one axis to vary the plane angle or "sweep back" there between, and means for turning the other pair of wings about the other axis to vary their angle of incidence.

VINCENT E. HEYWOOD.

Witnesses:
Penelope Comberbach,
Nellie Whalen.